United States Patent
Alemi

(10) Patent No.: US 11,681,924 B2
(45) Date of Patent: *Jun. 20, 2023

(54) TRAINING NEURAL NETWORKS USING A VARIATIONAL INFORMATION BOTTLENECK

(71) Applicant: Google LLC, Mountain View, CA (US)

(72) Inventor: Alexander Amir Alemi, San Jose, CA (US)

(73) Assignee: Google LLC, Mountain View, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 17/126,981

(22) Filed: Dec. 18, 2020

(65) Prior Publication Data

US 2021/0103823 A1 Apr. 8, 2021

Related U.S. Application Data

(63) Continuation of application No. 16/402,782, filed on May 3, 2019, now Pat. No. 10,872,296, which is a (Continued)

(51) Int. Cl.
*G06N 3/08* (2023.01)
*G06N 3/084* (2023.01)
(Continued)

(52) U.S. Cl.
CPC .............. *G06N 3/084* (2013.01); *G06N 3/045* (2023.01); *G06N 3/047* (2023.01)

(58) Field of Classification Search
CPC ..... G06N 3/0454; G06N 3/0472; G06N 3/084
See application file for complete search history.

(56) References Cited

U.S. PATENT DOCUMENTS

2014/0229158 A1 8/2014 Zweig et al.

FOREIGN PATENT DOCUMENTS

| CN | 101639937 A | 2/2010 |
| CN | 103531205 A | 1/2014 |

(Continued)

OTHER PUBLICATIONS

Kingma et al., Auto-Encoding Variational Bayes, pp. 1-14, May 2014. (Year: 2014).*

(Continued)

*Primary Examiner* — Kamran Afshar
*Assistant Examiner* — Marshall L Werner
(74) *Attorney, Agent, or Firm* — Fish & Richardson P.C.

(57) ABSTRACT

Methods, systems, and apparatus, including computer programs encoded on computer storage media, for training a neural network. One of the methods includes receiving training data; training a neural network on the training data, wherein the neural network is configured to: receive a network input, convert the network input into a latent representation of the network input, and process the latent representation to generate a network output from the network input, and wherein training the neural network on the training data comprises training the neural network on a variational information bottleneck objective that encourages, for each training input, the latent representation generated for the training input to have low mutual information with the training input while the network output generated for the training input has high mutual information with the target output for the training input.

18 Claims, 3 Drawing Sheets

Related U.S. Application Data continuation of application No. PCT/US2017/060003, filed on Nov. 3, 2017.

(60) Provisional application No. 62/418,100, filed on Nov. 4, 2016.

(51) Int. Cl.
  *G06N 3/045* (2023.01)
  *G06N 3/047* (2023.01)

(56) References Cited

FOREIGN PATENT DOCUMENTS

| | | |
|---|---|---|
| CN | 104933245 A | 9/2015 |
| CN | 105144203 A | 12/2015 |
| CN | 105378764 A | 3/2016 |
| CN | 105637540 A | 6/2016 |
| CN | 105940395 A | 9/2016 |
| EP | 3054403 A2 | 8/2016 |

OTHER PUBLICATIONS

Tishby et al, Deep Learning and the Information Bottleneck Principle, 5 pages, Mar. 2015. (Year: 2015).*
Kingma et al., Variational Dropout and the Local Reparameterization Trick, pp. 1-14, Dec. 2015. (Year: 2015).*
Chen et al., InfoGAN: Interpretable Representation Learning by Information Maximizing Generative Adversarial Networks, pp. 1-14, Jun. 2016. (Year: 2016).*
Achille et al., Information Dropout: Learning Optimal Representations Through Noisy Computation, Nov. 4, 2016. (Year: 2016).*
Alemi et al., Deep Variational Information Bottleneck, Dec. 2016. (Year: 2016).*
Chalk et al., Relevant Sparse Codes with Variational Information Bottleneck, Oct. 2016. (Year: 2016).*
Abadi et al, "Tensorflow: Large-scale machine learning on heterogeneous distributed systems" arXiv, Mar. 2016, 19 pages.
Achille et al, "Information dropout: Learning optimal representations through noisy computation" arXiv, Nov. 2016, 12 pages.
Alemi et al, "Deep variational information bottleneck," arXiv, Dec. 2016, 19 pages.
Baluja et al, [online] "The virtues of peer pressure: A simple method for discovering high-value mistakes" 2015 [retrieved: Jun. 5, 2019] retrieved from: URL <http://www.esprockets.com/papers/caip2015.pdf>, 12 pages.
Bandale et al, [online] "Towards open world recognition" 2015 [retrieved: Jun. 5, 2019] retrieved from: URL <https://www.cv-foundation.org/openaccess/content_cvpr_2015/papers/Bendale_Towards_Open_World_2015_CVPR_paper.pdf>, 10 pages.
Barber et al, "The IM algorithm: a variational approach to information maximization," Semantics Scholar, 2003, 8 pages.
Bialek et al, [online] "Predictability, complexity, and learning" Jan. 2001 [retrieved: Jun. 5, 2019] retrieved from: URL <https://www.princeton.edu/~wbialek/our_papers/bnt_01a.pdf>, 55 pages.
Blundell et al, "Weight uncertainty in neural networks" arXiv, May 2015, 10 pages.
Carlini et al, "Towards ecaluating the robustness of neural networks" arXiv, Aug. 2016, 10 pages.
Chalk et al, [online], "Relevant sparse codes with variational information bottleneck" 2016 [retrieved: Jun. 5, 2019] retrieved from: URL <https://papers.nips.cc/paper/6101-relevant-sparse-codes-with-variational-information-bottleneck.pdf>, 9 pages.
Chechik et al [online], "Information bottleneck for gaussian variables" Jan. 2005 [retrieved: Jun. 5, 2019] retrieved from: URL <http://www.jmlr.org/papers/volume6/chechik05a/chechik05a.pdf> 24 pages.
Chen et al., InfoGAN: Interpretable Representation Learning by Information Maximizing Generative Adversarial Networks, pp. 1-14, Jun. 2016.

Cuff et al [online], "Differential privacy as a mutual information constraint" 2016 [retrieved: Jun. 5, 2019] retrieved from: URL <http://delivery.acm.org/10.1145/2980000/2978308/p43-cuff.pdf?ip=216.58.166.69&id=2978308&acc=CHORUS&key=4D4702B0C3E38B35%2E4D4702B0C3E38B35%2E4D4702B0C3E38B35%2E6D218144511F3437&_acm_=1559757105_bc8a7373fld2cf4d7985874343210fcd> 12 pages.
Deng et al [online], "Imagenet: A large-scale hierarchical image database" 2009 [retrieved: Jun. 5, 2019] retrieved from: URL <http://www.image-net.org/papers/imagenet_cvpr09.pdf>, 8 pages.
Fawzi et al [online], "Robustness of classifiers: from adversarial to random noise" 2016 [retrieved: Jun. 5, 2019] retrieved from: URL <https://papers.nips.cc/paper/6331-robustness-of-classifiers-from-adversarial-to-random-noise.pdf>, 9 pages.
Glorot et al [online], "Understanding the difficulty of training deep feedforward neural networks" 2010 [retrieved: Jun. 5, 2019] retrieved from: URL <http://proceedings.mlr.press/v9/glorot10a/glorot10a.pdf> 8 pages.
Goodfellow et al, "Explaining and harnessing adversarial examples" arXiv, Mar. 2015, 11 pages.
Higgins et al, [online] "beta-VAE: Learning basic visual concepts with a constrained variational framework" 2017 [retrieved: Jun. 5, 2019] retrieved from: URL <https://openreview.net/pdf?id=Sy2fzU9gl>, 22 pages.
Huang et al, "Learning with a strong adversary" arXiv, Nov. 2015, 11 pages.
Kingma et al, "A method for stochastic optimization" arXiv, Jul. 2015, 15 pages.
Kingma et al, "Auto-encoding variational Bayes" arXiv, May 2014, 14 pages.
Kingma et al, "Semi-supervised learning with deep generative models," arXiv, Jun. 2014, 9 pages.
Kingnna et al, Variational Dropout and the Local Reparanneterization Trick, pp. 1-14, Dec. 2015.
Kurakin et al, "Adversarial examples in the physical world" arXiv, Feb. 2017, 14 pages.
Louizos et al, "The variational fair autoencoder" arXiv, Feb. 2016, 11 pages.
Mohamed et al, "Variational information maximisation for intrinsically motivated reinforcement learning," arXiv, Sep. 2015, 12 pages.
Moosavi-Dezfooli et al, "Deepfool: a simple and accurate method to fool deep neural networks" arXiv, Jul. 2016, 9 pages.
Moosavi-Dezfooli et al, "Universal adversarial perturbations" arXiv, Nov. 2016, 11 pages.
Nguyen et al, "Deep neural networks are easily fooled: High confidence predictions for unrecognizable images" arXiv, Apr. 2015, 20 pages.
Palmer et al [online], "Predictive information in a sensory population" Apr. 2015 [retrieved: Jun. 5, 2019] retrieved from: <https://www.pnas.org/content/pnas/112/22/6908.full.pdf>, 6 pages.
Papernot et al, "The limitations of deep learning in adversarial settings" arXiv, Nov. 2015, 16 pages.
PCT International Preliminary Report on Patentability in International Appln. PCT/US2017/06003, dated May 16, 2019, 10 pages.
PCT International Search Report and Written Opinion in the International Appln. PCT/US2017/060003, dated Feb. 13, 2018, 16 pages.
Pereyra et al [online], "Regularizing neural networks by penalizing confident output predictions" 2017 [retrieved: Jun. 5, 2019] retrieved from: URL <https://openreview.net/pdf?id=HyhbYrGYe>, 11 pages.
Polyak et al, "Acceleration of stochastic approximation by averaging" Jul. 1992 [retrieved: Jun. 5, 2019] retrieved from: URL <https://www.researchgate.net/profile/Boris_Polyak2/publication/236736831_Acceleration_of_Stochastic_Approximation_by_Averaging/links/0f31753227c964baab000000/Acceleration-of-Stochastic-Approximation-by-Averaging.pdf?origin=publication_detail> 19 pages.
Robinson et al, "Confusing deep convolution networks by relabelling" arXiv, Dec. 2015, 9 pages.
Sabour et al, "Adversarial manipulation of deep representations" arXiv, Mar. 2016, 18 pages.

(56) References Cited

OTHER PUBLICATIONS

Shaham et al, "Understanding Adversarial Training: Increasing Local Stability of Neural Nets through Robust Optimization," arXiv, Jan. 2016, 12 pages.
Shamir et al [online], "Learning and generalization with the information bottleneck" 2013, [retrieved: Jun. 5, 2019], retrieved from: URL <http://www.cs.huji.ac.il/labs/learning/Papers/ibgen.pdf> 13 pages.
Slonim et al [online], "Information-based clustering" Sep. 2005 [retrieved: Jun. 5, 2019] retrieved from: URL <https://www.pnas.org/content/pnas/102/51/18297.full.pdf>, 6 pages.
Still et al [online], "How many clusters? An information-theoretic perspective" 2004 [retrieved: Jun. 5, 2019] retrieved from: URL <https://www.princeton.edu/~wbialek/our_papers/still+bialek_04.pdf> 24 pages.
Szegedy et al, "Inception-v4, inception0resnet and the impact of residual connections on learning" arXiv, Aug. 2016, 12 pages.
Szegedy et al, "Intriguing properties of neural networks" arXiv, Feb. 2014, 10 pages.
Tishby et al, "Deep learning and the information bottleneck principle," arXiv, Mar. 2015, 5 pages.
Tishby et al, "The information bottleneck method," arXiv, Apr. 2000, 16 pages.
Wang et al, "Deep variational canonical correlation analysis" arXiv, Nov. 2016, 14 pages.
CN Office Action in Chinese Appln. No. 201780066234.8, dated Aug. 29, 2022, 25 pages (with English Translation).
Li, "Neurocomputing based structural finite element analysis," Chinese Doctoral Dissertations & Master's Theses (Doctoral Information Technology No. 1), Mar. 15, 2004, 131 pages (with English Abstract).

\* cited by examiner

TRAINING NEURAL NETWORKS USING A VARIATIONAL INFORMATION BOTTLENECK

CROSS-REFERENCE TO RELATED APPLICATIONS

This application is a continuation of U.S. application Ser. No. 16/402,782, filed May 3, 2019, which is a continuation of International Application No PCT/US2017/060003, filed on Nov. 3, 2017, which claims priority to U.S. Provisional Application No. 62/418,100, filed on Nov. 4, 2016. The disclosures of the prior applications are considered part of and are incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification generally describes a system implemented as one or more computers in one or more locations that trains a neural network on training data that includes a set of training inputs and, for each training input, a respective target output.

The neural network is a neural network that is configured to receive a network input, convert the network input into a latent representation of the network input, and to process the latent representation to generate a network output from the network input.

In particular, the system trains the neural network on a variational information bottleneck objective that encourages, for each training input, the latent representation generated for the training input to have low mutual information with the training input while the network output generated for the training input has high mutual information with the target output for the training input.

Thus in one aspect a method comprises receiving training data, the training data comprising a plurality of training inputs and, for each training input, a respective target output; training a neural network on the training data, wherein the neural network is configured to: receive a network input, convert the network input into a latent representation of the network input, and process the latent representation to generate a network output from the network input, and wherein training the neural network on the training data comprises training the neural network on a variational information bottleneck objective that encourages, for each training input, the latent representation generated for the training input to have low mutual information with the training input while the network output generated for the training input has high mutual information with the target output for the training input.

Optionally, the system can then provide data specifying the trained neural network for use in processing new network inputs.

Particular embodiments of the subject matter described in this specification can be implemented so as to realize one or more of the following advantages. By training a neural network on the above objective, the trained neural network can exceed the performance of neural networks trained on different objectives in generalizing to new inputs and, as is discussed in more detail below, being more robust to adversarial attack. Additionally, the predictive distributions generated by the trained neural network will be better calibrated than if the network was trained on a different objective. In particular, the training of the neural network is better regularized than training the same network on a conventional objective. Thus, by training the neural network in the manner described in this specification, the resulting trained neural network will be high performing while also being resistant to adversarial attacks and without overfitting on the training data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
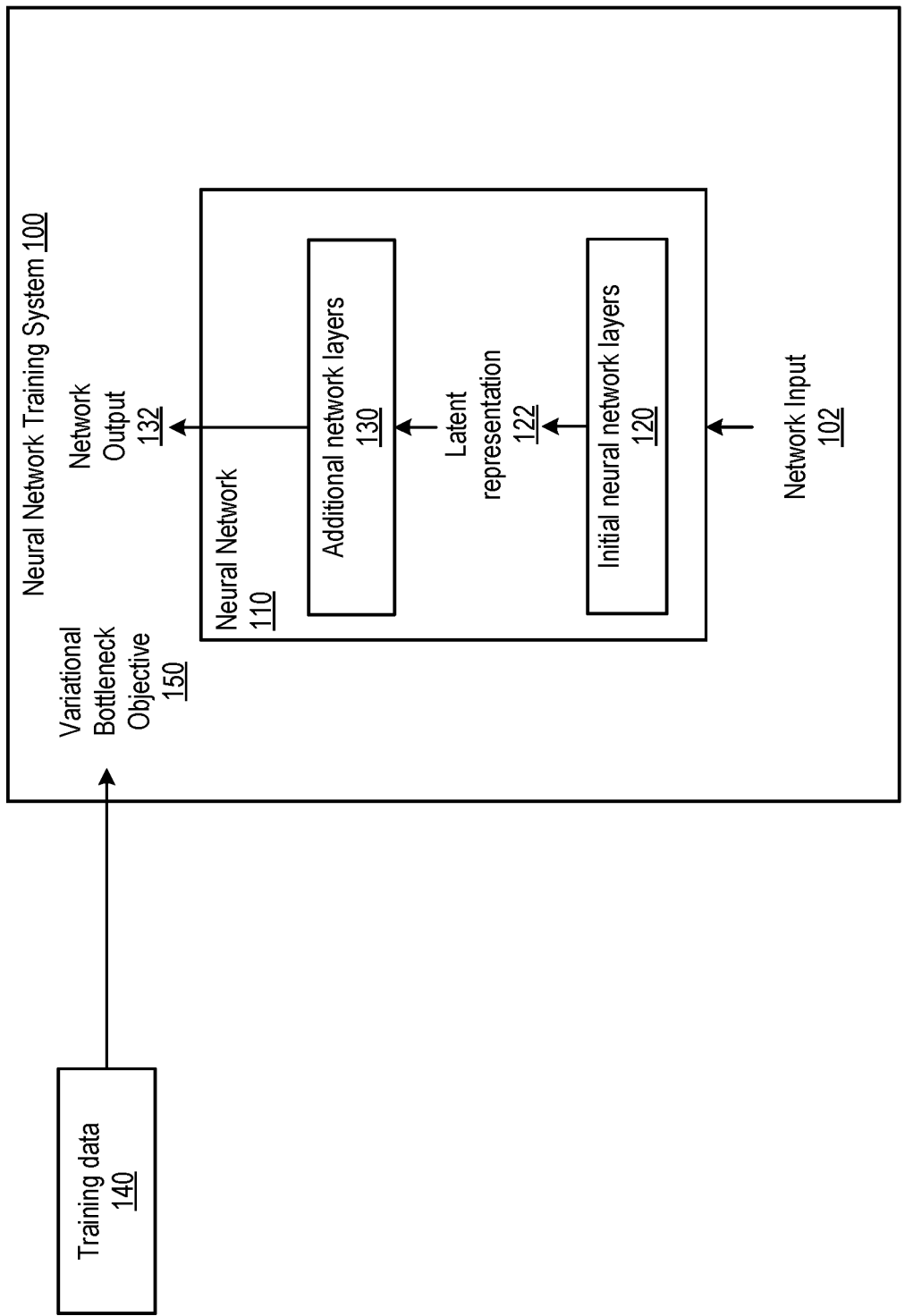
FIG. 1 shows an example neural network training system.

FIG. 1 shows an example neural network training system 100. The neural network training system 100 is an example of a system implemented as computer programs on one or more computers in one or more locations, in which the systems, components, and techniques described below can be implemented.

The neural network training system 100 is a system that trains a neural network 110 on training data 140 to determine trained values of the parameters of the neural network 110 from initial values of the parameters.

The neural network 110 can be configured to receive any kind of digital data input and to generate a network output for the input. The network output can be any output that defines a score distribution over a set of possible outputs for the input.

For example, if the inputs to the neural network are images or features that have been extracted from images, the output generated by the neural network for a given image may be scores for each of a set of object categories, with each score representing an estimated likelihood that the image contains an image of an object belonging to the category.

As another example, if the inputs to the neural network are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

The neural network 110 is configured to receive a network input 102, map the network input 102 to a latent representation 122 of the network input 102, and then generate a network output 132 from the latent representation 122 of the network input 102.

In particular, the neural network includes one or more initial neural network layers 120 that receive the network input 102 and process the network input 102 to generate an output that defines the latent representation 122 and one or more additional neural network layers 130 that process the latent representation 122 to generate the network output 132.

Generally, the latent representation 122 is an ordered collection of numeric values, e.g., a vector, a matrix, or a multi-dimensional matrix, that are a representation of the network input 102 as determined by the neural network 110.

Generally, the neural network 110 is a stochastic neural network. A stochastic neural network is a network that, assuming fixed values of the network parameters, will sometimes generate different network outputs for the same network input. In these implementations, the initial neural network layers 120 generate as an intermediate output the parameters of a distribution over possible latent representations and the neural network 110 samples the latent representation 122 from the distribution that is parameterized by the intermediate output generated by the initial neural network layers 120. For example, the intermediate output can be the means and covariances of a multivariate distribution over possible latent representations.

During training, in order for the sampling to be deterministic with respect to the intermediate output and to therefore allow effective backpropagation of gradients through the network, the neural network 110 also samples noise from a noise distribution that is independent from the parameters of the neural network 110. The neural network 110 then uses the sampled noise and the intermediate output to generate the latent representation 122, i.e., by deterministically combining the intermediate output and the sampled noise. For example, the noise distribution can be a multivariate Gaussian distribution. When the intermediate output is the mean and covariances of a multivariate distribution over possible latent representations, the neural network 110 can determine the latent representation 122 by, for each dimension, determining the product of the noise and the covariances and then adding the product to the mean to generate the latent representation.

The training data 140 that is used by the system 100 to train the neural network 110 includes multiple training inputs and, for each training input, a target output that should be generated by the neural network 110 by processing the training input. For example, in a classification context, the target output can be a one-hot encoding of the correct category or class into which the network input should be classified.

The system 100 trains the neural network 110 on the training data 140 by optimizing a variational bottleneck objective 150. In particular, the variational bottleneck objective 150 is an objective that encourages, for each training input in the training data 140, (i) the latent representation generated for the training input to have low mutual information with the training input while (ii) the network output generated for the training input has high mutual information with the target output for the training input.

Training the neural network on this objective is described in more detail below with reference to FIGS. 2 and 3.

Figure 2:
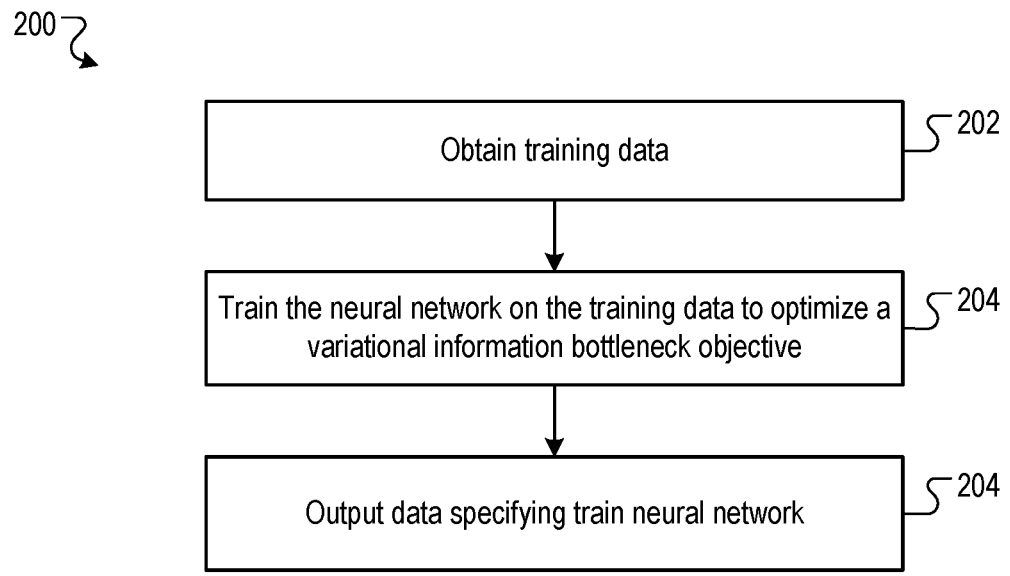
FIG. 2 is a flow diagram of an example process for training a neural network.

FIG. 2 is a flow diagram of an example process 200 for training a neural network using a variational information bottleneck. For convenience, the process 200 will be described as being performed by a system of one or more computers located in one or more locations. For example, a reinforcement learning system, e.g., the neural network training system 100 of FIG. 1, appropriately programmed, can perform the process 200.

The system obtains training data for training the neural network (step 202). The training data includes multiple training inputs and, for each training input, a respective target output that should be generated by the neural network for the training input.

The system trains the neural network on the training data to optimize a variational information bottleneck objective (step 204).

Generally, the variational information bottleneck objective has the form:

$$I(Z,Y) - \beta I(Z,X),$$

where $I(Z,Y)$ is the mutual information between the latent representation and the target output for a network input, $I(Z,X)$ is the mutual information between the latent representation and the network input and $\beta$ is a fixed positive constant value. Thus, by training the neural network on this objective, the system encourages the network to "forget" the network input (to a degree that is governed by $\beta$) when generating the latent representation while still having the latent representation be predictive of the target output.

In so doing, the trained neural network becomes better able to generalize to examples not seen during the training, resulting in improved performance on the task that the network is being trained to perform. In particular, the trained neural network can generate more accurate outputs for new received inputs, i.e., inputs that are not the same as any of the inputs used in training the neural network.

The trained neural network also becomes more resistant to adversarial attacks. An adversarial attack is a computer security problem that can undermine the reliability of computer systems that employ neural networks, e.g., systems that provide data to users that is generated based on network outputs generated by one or more neural networks. By training the neural network(s) to be more resistant to adversarial attacks as described in this specification, the computer security of the computer systems is improved. More specifically, an adversarial attack occurs when malicious users provide the neural network with inputs that are minimally perturbed from a legitimate input in order or to attempt to cause the network to generate an incorrect output, which would reduce the reliability of the system that uses the outputs of the network. That is, generally, a well-trained neural network should generate the same output for a given test input and another input that is minimally perturbed from the test input. However, many neural networks that otherwise perform well on a given task will instead generate a much different output for the perturbed input than for the test input, which the network may otherwise process correctly. A neural network trained using the described objective, however, will be more resistant to such attacks and will likely instead generate the same (correct) output for the test input and the minimally perturbed input.

In many cases it is not feasible for the system to directly optimize the variational information bottleneck objective, i.e., because directly computing and backpropagating through the variational information bottleneck objective for a large amount of training data is not computationally feasible at least in part because of the direct computation of the mutual information measures that would be required.

Thus, to train the neural network on the objective, for each training input the system performs a respective iteration of a machine learning training procedure, e.g., gradient descent with backpropagation, to determine a gradient with respect to the network parameters of a lower bound of the variational information bottleneck objective and then determines a corresponding update to the current values of the network parameters. Determining such an update is described in more detail below with reference to FIG. 3.

Once the neural network has been trained, in some implementations the system outputs trained neural network data (step 206). That is, the system can output, e.g., by outputting to a user device or by storing in a memory accessible to the system, the trained values of the network parameters for later use in processing inputs using the trained neural network.

Alternatively or in addition to outputting the trained neural network data, the system can receive inputs to be processed, e.g., through an application programming interface (API) offered by the system, use the trained neural network to process the received inputs to generate network outputs, and then provide the generated network outputs in response to the received inputs.

Figure 3:
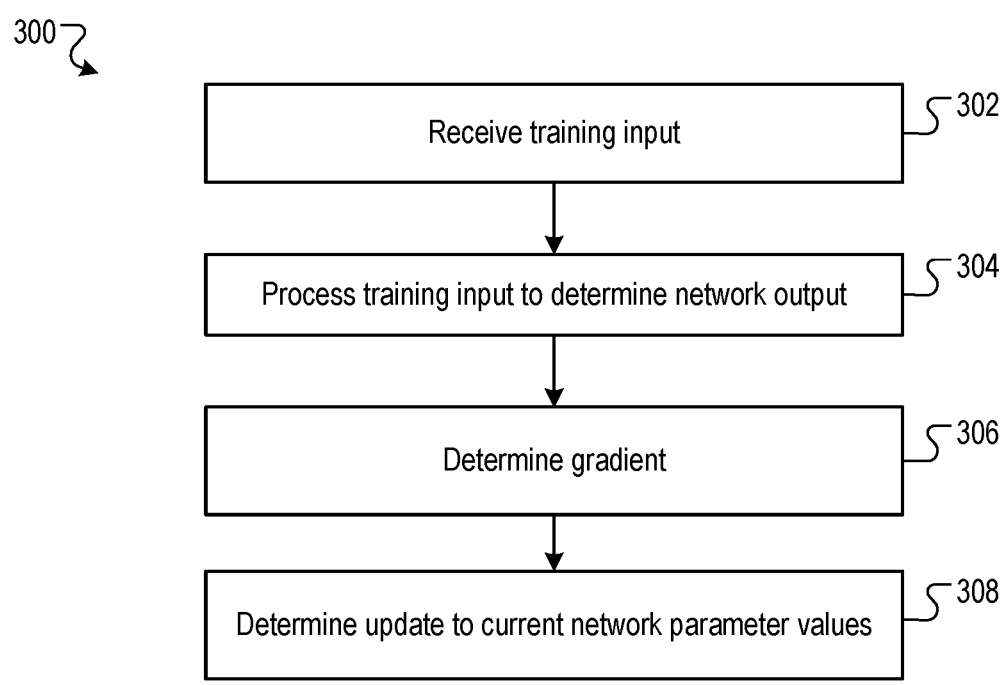
FIG. 3 is a flow diagram of an example process for determining an update to current values of the parameters of the neural network.

FIG. 3 is a flow diagram of an example process 300 for determining an update to current values of the network parameters. For convenience, the process 300 will be described as being performed by a system of one or more computers located in one or more locations. For example, a reinforcement learning system, e.g., the neural network training system 100 of FIG. 1, appropriately programmed, can perform the process 300.

The system can perform the process 300 during the training of the neural network for a batch of training inputs to determine a respective update to the current values of the network parameters for each input in the batch. The system can then apply, i.e., add, the updates determined for the inputs in the batch to generate updated values of the network parameters.

The system receives a training input and target output for the training input (step 302).

The system processes the training input using the neural network and in accordance with current values of the network parameters to determine a network output for the training input (step 304). As described above, the network output generally defines a score distribution over possible outputs for the training input. As part of processing the training input, the neural network maps the training input to an intermediate output that defines a distribution over possible latent representations, samples a latent representation using the intermediate output, and then generates the network output from the latent representation. As described above, in order for the sampling to be deterministic with respect to the intermediate output, to sample the latent representation, the neural network samples noise from a noise distribution that is independent from the parameters of the neural network and deterministically combines the intermediate output and the sampled noise.

Generally, the system samples the noise from a predetermined noise distribution, e.g., a Gaussian distribution. In some implementations, the system samples noise for each training input. In other implementations, the system uses the same noise for each training input in the batch, i.e., only samples noise once per batch.

The system determines a gradient with respect to the network parameters of a lower bound of the variational information bottleneck objective (step 306). In particular, the system represents the lower bound as an objective function to be minimized that satisfies, for a given training input $x_n$:

$$\frac{1}{N}([-\log(q(y_n \mid f(x_n, \epsilon))] + \beta KL[p(Z \mid x_n), r(Z)]),$$

where N is the total number of training inputs in the set of training data, $q(y_n \mid f(x_n, \epsilon))$ is the score assigned to the target output for the training input $x_n$ by the network output for the training input $x_n$, $\epsilon$ is the noise sampled from the noise distribution, $f(x_n, \epsilon)$ is the latent representation sampled using the noise $\epsilon$ and the intermediate output for the training input $x_n$, KL is the Kullback-Leibler divergence, $p(Z \mid x_n)$ is the probability distribution over possible latent representations defined by the intermediate output, and $r(Z)$ is a variational approximation of a marginal distribution of the latent representation.

The system can use any appropriate distribution as the variational approximation of the marginal distribution of the latent representation. For example, when the latent representations are K-dimensional, the variational approximation of the marginal distribution can be a fixed K-dimensional spherical Gaussian.

The system can determine the gradient of the lower bound with respect to the network parameters using a conventional technique, e.g., by backpropagating the gradients through the neural network.

The system determines an update to the network parameters from the gradient (step 308) in accordance with the training technique being used to train the neural network. For example, when the technique is stochastic gradient descent, the system can apply a learning rate to the gradient to determine the update.

The system can perform the process 300 for multiple batches of training data to iteratively update the values of the network parameters from initial values to trained values.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving training data, the training data comprising a plurality of training inputs and, for each training input, a respective target output;
training a neural network on the training data, wherein the neural network is configured to:
 receive a network input,
 generate a latent representation of the network input, comprising:
  processing the network input through one or more initial neural network layers of the neural network to generate an intermediate output that defines a distribution over latent representations; and
  sampling the latent representation of the network input from the distribution defined by the intermediate output, and
 process the latent representation through one or more additional neural network layers of the neural network to generate a network output from the network input,
wherein training the neural network on the training data comprises, for each training input, performing an iteration of stochastic gradient descent on a lower bound of a variational information bottleneck objective to determine an update to current values of parameters of the neural network, wherein the lower bound is represented as an objective function to be minimized that satisfies, for a given training input $x_n$:

$$\frac{1}{N}([-\log(q(y_n \mid f(x_n, \epsilon)))] + \beta KL[p(Z \mid x_n), r(Z)]),$$

where N is the total number of training inputs in the set of training data, $q(y_n \mid f(x_n,\epsilon))$ is a score assigned to the target output $y_n$ for the training input $x_n$ by the network output for the training input $x_n$, $\epsilon$ is noise sampled from a noise distribution, $f(x_n,\epsilon)$ is the latent representation generated from the sampled noise and the intermediate output for the training input $x_n$, $\beta$ is a fixed constant value, KL is the Kullback-Leibler divergence, $p(Z|x_n)$ is the probability distribution over latent representations Z defined by the intermediate output, and $r(Z)$ is a variational approximation of a marginal distribution of the latent representations Z; and providing data specifying the trained neural network for use in processing new network inputs.

2. The method of claim 1, wherein sampling the latent representation comprises:
sampling noise from a pre-determined noise distribution that is independent of the intermediate output; and
generating the latent representation from the sampled noise and the intermediate output.

3. The method of claim 1, wherein the lower bound depends on a variational approximation of a likelihood of the network output for the training input given the latent representation for the training input.

4. The method of claim 1, wherein the lower bound depends on a variational approximation of a marginal distribution of the latent representation for the training input.

5. The method of claim 1, wherein the trained neural network is resistant to adversarial perturbations.

6. The method of claim 5, wherein the trained neural network generates a same network output for a test input and a minimal perturbation of the test input.

7. A computer-implemented method comprising:
receiving a network input;
generating, using a neural network, a latent representation of the network input, comprising:
processing the network input through one or more initial neural network layers of the trained neural network to generate an intermediate output that defines a distribution over latent representations; and
sampling the latent representation of the network input from the distribution defined by the intermediate output; and
processing the latent representation through one or more additional neural network layers of the trained neural network to generate a network output from the network input,
wherein the neural network has been trained using a method comprising:
receiving training data, the training data comprising a plurality of training inputs and, for each training input, a respective target output; and
training the neural network on the training data, comprising, for each training input, performing an iteration of stochastic gradient descent on a lower bound of a variational information bottleneck objective to determine an update to current values of parameters of the neural network, wherein the lower bound is represented as an objective function to be minimized that satisfies, for a given training input $x_n$:

$$1/N([-\log(q(y_n|F(x_n,\epsilon))]+\beta KL[p(Z|x_n),r(Z)]),$$

where N is the total number of training inputs in the set of training data, $q(y_n|f(x_n, \epsilon))$ is a score assigned to the target output $y_n$ for the training input $x_n$ by the network output for the training input $x_n$, $\epsilon$ is noise sampled from a noise distribution, $f(x_n,\epsilon)$ is the latent representation generated from the sampled noise and the intermediate output for the training input $x_n$, $\beta$ is a fixed constant value, KL is the Kullback-Leibler divergence, $p(Z|x_n)$ is the probability distribution over latent representations Z defined by the intermediate output, and $r(Z)$ is a variational approximation of a marginal distribution of the latent representations Z.

8. The method of claim 7, wherein sampling the latent representation comprises:
sampling noise from a pre-determined noise distribution that is independent of the intermediate output; and
generating the latent representation from the sampled noise and the intermediate output.

9. The method of claim 7, wherein the lower bound depends on a variational approximation of a likelihood of the network output for the training input given the latent representation for the training input.

10. The method of claim 7, wherein the lower bound depends on a variational approximation of a marginal distribution of the latent representation for the training input.

11. The method of claim 7, wherein the neural network is resistant to adversarial perturbations.

12. The method of claim 11, wherein the neural network generates a same network output for a test input and a minimal perturbation of the test input.

13. A system comprising one or more computers and one or more storage devices storing instructions that, when executed by the one or more computers, cause the one or more computers to perform operations comprising:
receiving a network input;
generating, using a neural network, a latent representation of the network input, comprising:
processing the network input through one or more initial neural network layers of the trained neural network to generate an intermediate output that defines a distribution over latent representations; and
sampling the latent representation of the network input from the distribution defined by the intermediate output; and
processing the latent representation through one or more additional neural network layers of the trained neural network to generate a network output from the network input,
wherein the neural network has been trained using a method comprising:
receiving training data, the training data comprising a plurality of training inputs and, for each training input, a respective target output; and
training the neural network on the training data, comprising, for each training input, performing an iteration of stochastic gradient descent on a lower bound of a variational information bottleneck objective to determine an update to current values of parameters of the neural network, wherein the lower bound is represented as an objective function to be minimized that satisfies, for a given training input $x_n$:

$$1/N([-\log(q(y_n|F(x_n,\epsilon))]+\beta KL[p(Z|x_n),r(Z)]),$$

where N is the total number of training inputs in the set of training data, $q(y_n|f(x_n,\epsilon))$ is a score assigned to the target output $y_n$ for the training input by the network output for the training input E is noise sampled from a noise distribution, $f(x_n,\epsilon)$ is the latent representation generated from the sampled noise and the intermediate output for the training input $x_n$, $\beta$ is a fixed constant value, KL is the Kullback-Leibler divergence, $p(Z|x_n)$ is the probability distribution over latent representations Z defined by the intermediate output, and $r(Z)$ is a variational approximation of a marginal distribution of the latent representations Z.

14. The system of claim 13, wherein the operations for sampling the latent representation comprise:
sampling noise from a pre-determined noise distribution that is independent of the intermediate output; and generating the latent representation from the sampled noise and the intermediate output.

15. The system of claim 13, wherein the lower bound depends on a variational approximation of a likelihood of the network output for the training input given the latent representation for the training input.

16. The system of claim 13, wherein the lower bound depends on a variational approximation of a marginal distribution of the latent representation for the training input.

17. The system of claim 13, wherein the neural network is resistant to adversarial perturbations.

18. The system of claim 17, wherein the neural network generates a same network output for a test input and a minimal perturbation of the test input.

* * * * *